(12) United States Patent
Damola et al.

(10) Patent No.: US 8,898,247 B2
(45) Date of Patent: *Nov. 25, 2014

(54) NETWORK CACHE ARCHITECTURE STORING POINTER INFORMATION IN PAYLOAD DATA SEGMENTS OF PACKETS

(75) Inventors: Ayodele Damola, Solna (SE); Stefan Hellkvist, Stockholm (SE); Lars Westberg, Enköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 43 days.

This patent is subject to a terminal disclaimer.

(21) Appl. No.: 13/376,918

(22) PCT Filed: Jun. 17, 2009

(86) PCT No.: PCT/EP2009/057526

§ 371 (c)(1),
(2), (4) Date: Dec. 8, 2011

(87) PCT Pub. No.: WO2010/145699

PCT Pub. Date: Dec. 23, 2010

(65) Prior Publication Data

US 2012/0084385 A1    Apr. 5, 2012

(51) Int. Cl.
*G06F 15/167*    (2006.01)
*H04L 12/24*    (2006.01)
*H04L 29/06*    (2006.01)
*H04N 21/2381*    (2011.01)
*H04N 21/472*    (2011.01)
*H04L 29/08*    (2006.01)
*H04N 21/6437*    (2011.01)

(52) U.S. Cl.
CPC .............. *H04L 65/605* (2013.01); *H04L 12/24* (2013.01); *H04L 67/2819* (2013.01); *H04L 67/2842* (2013.01); *H04N 21/6437* (2013.01); *H04N 21/2381* (2013.01); *H04N 21/47202* (2013.01); *H04L 29/06* (2013.01); *H04L 29/08729* (2013.01); *H04L 65/608* (2013.01)
USPC ............................. 709/213; 709/231; 709/232

(58) Field of Classification Search
CPC ....... H04L 47/125; H04L 45/54; H04L 45/74; H04L 47/12; H04L 41/0803; H04L 61/103; H04L 61/256; H04L 12/4633; H04L 63/166; H04L 63/0428; H04L 63/1425; H04L 69/16; H04L 29/06; H04L 63/20
USPC ......................................................... 709/213
See application file for complete search history.

(56) References Cited

U.S. PATENT DOCUMENTS 5,907,678 A    5/1999    Housel, III et al.
6,073,129 A    6/2000    Levine et al.
(Continued)

*Primary Examiner* — Douglas W Owens
*Assistant Examiner* — Monica C King
(74) *Attorney, Agent, or Firm* — Coats & Bennett, P.L.L.C.

(57) ABSTRACT

There is described a method and apparatus for sending data through one or more packet data networks. A reduced size packet is sent from a packet sending node towards a cache node, the reduced size packet including in its payload a pointer to a payload data segment stored in a file at the cache node. When the reduced size packet is received at the cache node, the pointer is used to identify the payload data segment from data stored at the cache node. The payload data segment is inserted into the reduced size packet in place of the pointer so as to generate a full size packet, which is sent from the cache node towards a client.

22 Claims, 7 Drawing Sheets

(56) References Cited

U.S. PATENT DOCUMENTS

| | | | |
|---|---|---|---|
| 6,453,343 B1* | 9/2002 | Housel et al. | 709/213 |
| 6,628,620 B1 | 9/2003 | Cain | |
| 7,054,911 B1* | 5/2006 | Lango et al. | 709/213 |
| 7,296,091 B1* | 11/2007 | Dutta et al. | 709/245 |
| 2002/0016852 A1* | 2/2002 | Nishihara | 709/236 |
| 2002/0023165 A1* | 2/2002 | Lahr | 709/231 |
| 2003/0053546 A1 | 3/2003 | Gandhi et al. | |
| 2003/0195924 A1* | 10/2003 | Franke et al. | 709/203 |
| 2006/0018479 A1 | 1/2006 | Chen | |
| 2007/0014404 A1* | 1/2007 | Cha | 380/201 |
| 2007/0266169 A1 | 11/2007 | Chen et al. | |
| 2008/0256147 A1 | 10/2008 | Anand et al. | |
| 2008/0320151 A1* | 12/2008 | McCanne et al. | 709/228 |
| 2010/0192225 A1* | 7/2010 | Ma et al. | 726/23 |

* cited by examiner

NETWORK CACHE ARCHITECTURE STORING POINTER INFORMATION IN PAYLOAD DATA SEGMENTS OF PACKETS

TECHNICAL FIELD

The present invention relates to a network cache architecture. In particular, the invention relates to an application agnostic caching architecture suitable for mobile and fixed networks. The invention is applicable, but not limited to, a mechanism for caching content in a Video on Demand (VoD) system in an application agnostic way suitable for networks that have links with high bandwidth costs such as mobile networks.

BACKGROUND

Typical file caching methods include a cache receiving a file from a file server, and storing the entire file. Later when a client desires the file, instead of serving the file from the file server, the file is served from the cache. Because the cache is typically a server that is closer to the client, or has higher bandwidth than the file server, the file is served to the client quickly from the cache.

The application of typical file caching methods to files that include streaming media data, for example Video on Demand (VoD) files, can lead to new problems. VoD systems generally either stream content through a set-top box, allowing viewing in real time, or download it to a device such as a computer, digital video recorder, personal video recorder or portable media player for viewing at any time. The data delivered by networks delivering such content can run to very large amounts, and caching can be particularly useful.

This can be understood with reference to FIG. 1, which is a schematic illustration of an exemplary architecture of a VoD system with deployed caches used to reduce the load on a central long-tail server. In the example, it can be supposed that the network uses Real-Time Streaming Protocol (RTSP) streaming, where the payload is transported over the User Datagram Protocol (UDP) in Real-Time Protocol (RTP) packets, but it will be appreciated that many other applications and protocols have a similar architecture and will have similar issues.

The architecture of FIG. 1 includes a network 100 having a streaming server 101 and a number of caches 102-106. Clients 107-109 are configured to receive files and/or streaming data from the server 101 or the caches 102-106. The clients use RTSP to set up and control streams of RTP packets. This includes the negotiation of codecs, bitrates, ports etc for the resulting RTP stream. With RTSP the clients can start and stop the streaming, or fast forward or rewind the streamed media clip.

RTP packets are sent in sequence with a sequence number to tell the client the order of the packets. This infers a state into the protocol that the streaming server 101 needs to maintain and increment for each data packet it sends out. The sequence number is also used by the clients 107-109 to detect packet loss which is reported back to the streaming server using the Real-Time Transport Control Protocol (RTCP).

In order to reduce the load on the central server 101 and to save bandwidth in the delivery network 100, some of the content is stored in caches 102-106 closer to the end users 107-109.

The example of RTSP streaming for VoD highlights one problem with caching in general—namely that the caches 102-106 themselves need to understand the protocol and the application. The fundamental principle of a cache is that, when it takes over the role of the central server, it needs to understand the same protocol that the server understands, and know and maintain all required states etc. This applies whether the role of the central server is taken over transparently through re-routing with deep packet inspection, or through other means in the form of some redirection such as DNS based redirection or any redirection given by the protocol. If caching is to be deployed for many different applications, or if the server or protocol is enhanced or upgraded, it is also necessary to upgrade and maintain the caches. It is often the case that there is one cache per application: for example there may be a HTTP cache, a P2P cache and an RTSP cache. In some networks, such as mobile networks for example, caches can be placed in places that are hard to reach. If an upgrade of functionality is needed whenever a new application is deployed this can be costly.

Additional problems may arise if there is mobility in the network so that the client can move around during a session (such as a mobile terminal moving between base stations). Using the example above, suppose one of the clients 107 is receiving data from one of the caches 104. If the client 107 moves location so that it is now receiving data from another cache 105, the session state (in this example, the RTP packet sequence number) needs to be migrated into the new cache 105, which may or may not also include the relevant content, so that the session can continue in the new place. A great deal of application specific knowledge is therefore required in the cache implementation.

SUMMARY

It is the object of the present invention to obviate at least some of the above disadvantages.

It would be desirable to make caches "application agnostic" so that they can be used for any application. It would be desirable to be able to use the same caching infrastructure for several different applications such as RTSP streaming, and HTTP or PTP downloads. It is also desirable that no session state needs to be migrated between caches.

In accordance with one aspect of the present invention there is provided a cache for use in a packet data network. The cache comprises a receiver for receiving a packet, a storage medium for storing cached data, and a processor operatively connected to the receiver and storage medium. The processor is arranged to identify whether a payload of the packet contains pointer information identifying a payload segment of the data stored in the storage medium. If so, the processor is arranged to use the pointer information to locate and retrieve the payload data segment from the storage medium, and insert the retrieved payload data segment into the payload of the packet. The cache also includes a transmitter operatively connected to the processor for forwarding the packet towards a client.

This means that the cache can receive "stripped down" packets that contain a pointer information instead of a full set of payload data. The cache can use this pointer information to re-generate full size packets with their required payload data. In one embodiment, the processor replaces the pointer information in the packet with the retrieved payload data segment.

In order to identify whether the payload of the packet contains the pointer information, the processor may be arranged to carry out Deep Packet Inspection (DPI). Alternatively, the processor may be arranged to search a header of the packet for a marker identifying whether the payload of the packet contains the pointer information.

The pointer information may include a file ID identifying a file stored in the storage medium containing the payload data segment, a location ID identifying the location of the data segment within the file, and a length ID identifying the length of the data segment.

In accordance with another aspect of the present invention there is provided a payload stripper node for use in a packet data network. The payload stripper node comprises a receiver for receiving a packet, a storage medium for storing records of data held by a cache, and a processor operatively connected to the receiver and storage medium. The processor is arranged to identify whether a payload data segment contained in a payload of the packet is held by the cache. If so, the processor extracts the payload data segment from the packet and inserts pointer information into the packet. The pointer information is for enabling the cache to identify the payload data segment from the data held by the cache. A transmitter is operatively connected to the processor for forwarding the packet towards the cache.

The payload stripper node thus enables "stripped down" packets to be sent across a part of a network (or networks) where there is low bandwidth. Full size packets can be sent as normal by a server, and intercepted by the payload stripper node.

The payload stripper may be arranged to populate the cache with data. This ensures that the payload stripper knows which data is stored by the cache, and how the pointer information should be configured to enable the cache to find the payload data when it receives the packet.

The processor may be arranged to insert a marker into a header of the packet to indicate that it contains pointer information instead of payload data.

The payload stripper node may be further arranged to combine packets from which payload segments have been extracted to form an aggregated packet. This enables a reduction in the number of packets being sent, as well as (or instead of) a reduction in their size.

It may be that a server sends reduced size packets. This may be seen as the payload stripper node being located at the server, although in this case there will be no need to receive full size packets and remove the payload data. Thus in accordance with a further aspect of the present invention there is provided a server for sending data in a packet data network. The server comprises a storage medium for storing records of data held by a cache downstream of the server and a processor operatively connected to the storage medium. The processor is arranged to generate a packet to be sent towards a client to enable a payload segment of data to be delivered to the client. The processor identifies whether the payload data segment is held by the cache. If so, the processor inserts pointer information into the packet which will enable the cache to identify the payload data segment from the data it holds. A transmitter is operatively connected to the processor for forwarding the packet towards the cache.

In accordance with a further aspect of the present invention there is provided a system for transmitting data through one or more packet data networks. The system comprises a packet sending node and a cache node. The packet sending node is arranged to send a reduced size packet towards the cache node, the reduced size packet including in its payload a pointer to a payload data segment stored in a file at the cache node. The cache node is arranged to receive the reduced size packet, use the pointer to identify the payload data segment from data stored at the cache node, and insert the payload data segment into the reduced size packet in place of the pointer so as to generate a full size packet. The full size packet is then towards a client.

The packet sending node may be a packet stripping node arranged to receive a full size packet containing the payload data segment, remove the payload data segment from the full size packet and replace it with the pointer to generate the reduced size packet. Alternatively, the packet sending node may be a server.

The packet data network (or networks) may include a plurality of cache nodes, each having the same data stored thereon. This means that, if a user switches end point during the lifetime of a session, no session state needs to be migrated between caches.

In accordance with another aspect of the present invention there is provided a method of sending data through one or more packet data networks. The method comprises sending a reduced size packet from a packet sending node towards a cache node. The reduced size packet includes in its payload a pointer to a payload data segment stored in a file at the cache node. When the reduced size packet is received at the cache node, the pointer is used to identify the payload data segment from data stored at the cache node. The payload data segment is inserted into the reduced size packet in place of the pointer so as to generate a full size packet, which is sent from the cache node towards a client.

The packet sending node may be a packet stripping node which receives a full size packet containing the payload data segment, removes the payload segment from the full size packet and replaces it with the pointer to generate the reduced size packet. Alternatively, the packet sending node may be a server.

It will be appreciated that the various elements described above may not necessarily all be found within the same network. The server, payload stripper (if present), cache and client may all be within the same network, but may also be found in different networks. In particular it is often the case that the server and client are in different networks.

The present invention also provides a program adapted to be executed on a cache in a packet data network. The program is operable to identify whether a payload of a packet received by the cache contains pointer information identifying a payload segment of data stored by the cache and, if so, use the pointer information to locate and retrieve the payload data segment, insert the retrieved payload data segment into the payload of the packet, and forward the packet towards a client.

The present invention also provides a program adapted to be executed on a packet stripper node in a packet data network. The program is operable to identify whether a payload data segment contained in a payload of a packet received by the packet stripper node is held by a cache downstream of the packet stripper node. If so, the program is operable to extract the payload data segment from the packet, and insert pointer information into the packet, which will enable the cache to identify the payload data segment from the data held by the cache.

In accordance with another aspect of the present invention there is provided a program adapted to be executed on a server in a packet data network. The program is operable to generate a packet to be sent towards a client to enable a payload segment of data to be delivered to the client. The program is also operable to identify whether the payload data segment is held by a cache downstream of the server. If so, the program is operable to insert pointer information into the packet, which will enable the cache to identify the payload data segment from the data held by the cache.

The invention also includes a carrier medium carrying any of the programs described above.

Thus, for content which is known to be cached downstream, packets are still sent normally, but containing pointer information instead of at least some of the data payload. It is up to the cache further downstream to fill in the true payload into the packets as the packets arrive at the cache and continue to their final destination. The session state and application logic can still be kept centrally, and the cache can be made to work exactly the same way, regardless of which application it is serving. The cache can provide storage close to the end users without knowing anything about the application—if it is streaming of video, HTTP download or P2P traffic.

BRIEF DESCRIPTION OF THE DRAWINGS

Some preferred embodiments will now be described by way of example only and with reference to the accompanying drawings, in which.

DETAILED DESCRIPTION

Figure 1:
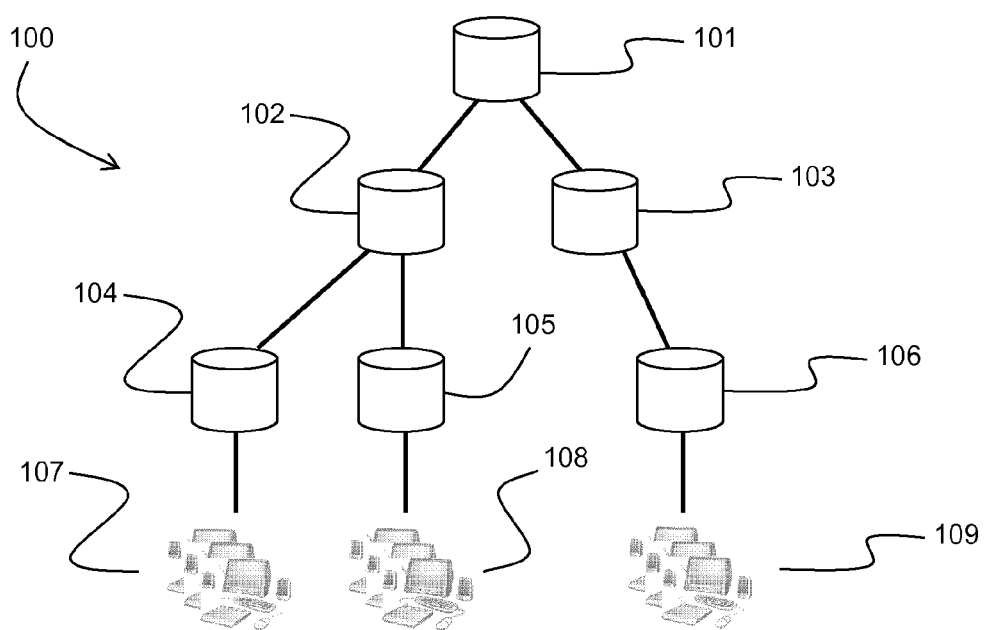
FIG. 1 is a schematic illustration of a network architecture.
Figure 2:
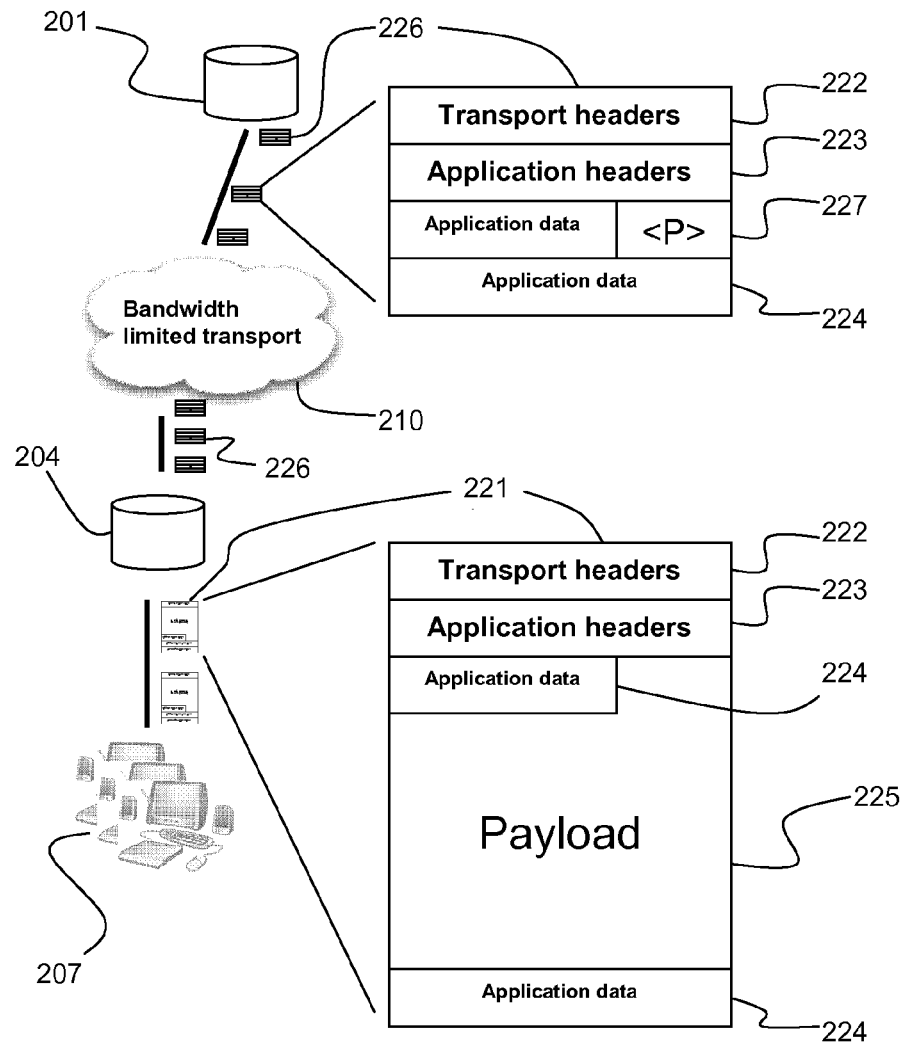
FIG. 2 is a schematic illustration of part of a network including a cache.

FIG. 2 is a schematic illustration of a network architecture, showing a central server 201, cache 204 and client 207. Part of the network 210 is bandwidth limited, so it is desirable to avoid sending large amounts of data across this part.

The network is used to send packets 221 to the client 207. Each packet 221 received by the client 207 should include transport and application headers 222, 223, application data 224 such as state information, and a data payload 225. These packets are large and require a lot of bandwidth.

In order not to overload the bandwidth limited transport 210, the central server sends reduced size packets 226 towards the cache 204. This can only be done if the central server 201 knows that the content is held in the cache 204. In the reduced size packets 226 the data payload 225 (all data content excluding application headers and state) has been replaced by a simple pointer <P> 227 into a file held at the cache 204. The pointer 227 contains the following information:

a file ID so that the cache can identify the file in which the correct content is held by the cache;

a location within the file of the correct data payload for that packet;

the length of the resulting data segment the cache should retrieve from the file when processing the packet.

Application specific logic such as headers 222, 223 and states 224 (in the example with RTP packets this would be RTP headers and the sequence number) is kept in place in the reduced size packets 226. The only thing that is different is that the data payload 225 (which is stored in the cache) is not sent from the server.

When such a reduced size packet 226 is received by the cache 204, a "payload inserter" function in the cache will go through the packet searching for a pointer <P>. When the pointer 227 is found, the payload inserter will identify the cached file referred to in the pointer, and identify the location in the file and the amount of data referred to by the pointer. This data is copied from the cached file and inserted into the reduced size packet 226 as payload data 225 in place of the pointer 227 so as to generate a full size packet 221. The full size packet 221 is then delivered onwards towards the client 207. The cache storage medium, where the file is stored, may be local storage such as RAM, flash memory or hard drive, or more distributed local storage such as one provided by a distributed caching hierarchy.

Thus the cache 204 does not need to know anything about the type of data or application. It simply needs to replace a pointer with a payload.

Some applications may require application state data to be mixed with the payload data. In this situation reduced size packets may contain more than one pointer, interspersed between application state data.

It will be appreciated that, in order for the central server 201 (the streaming server in the case of VoD over RTSP/RTP) to know when to send the reduced size packets, it needs to know what is cached further down into the network. One way of enabling this is to ensure that the server 201 has control over the information stored by the cache (or caches) 204. The server 201 may instruct the caches 204 what to store, and maintain a list of content stored in the caches 204. The transfer of data from the server to the caches could be at regular intervals, such as every night. This also ensures that the server 201 has the necessary information about file ID and data location to insert the correct pointers into the reduced size packets.

As an alternative, the cache 204 may maintain its content without control from the server 201. If a request for content from the client 207 passes through the cache 204, the cache may recognise this and mark the request to identify whether or not it has the requested content stored, for example using a header field in the request packet header, before passing it on. When the server 201 receives the request it knows from the marked request whether or not the cache has the content stored and therefore whether it should send full size or reduced size packets.

In some situations it may not be desirable or possible for a server to control the data held by caches further downstream. In these situations, an additional "payload stripper" node may also be used. The operation of such a node may be understood with reference to FIG. 3, which is a schematic illustration of an alternative network architecture, showing a central server 301, cache 204, client 207 and payload stripper 330.

In this situation, the client 207 may request content from the server 301 in the usual way. The server sends full size packets 321 back towards the client, whether or not this content is cached elsewhere in the network. These packets contain transport and application headers 222, 223, application data 224 and a payload 225 so that they are in a suitable form for delivery to the client 207.

The payload stripper 330 intercepts each full size packet 321, removes the payload 225 and replaces it with a pointer <P> 227, in the same manner as the server 201 described above with reference to FIG. 2. The difference is that the payload is removed by the payload stripper 330 rather than the server 301. Each reduced size packet 226 is forwarded towards the cache 204 across the bandwidth limited transport 210.

The payload inserter function in the cache 204 reconstructs full size packets 221 as described above with reference to FIG. 2, and forwards them towards the client 207.

Thus the arrangement can be seen to have two constituent parts either side of the bandwidth limited transport 210: the payload stripper 330 and the payload inserter in the cache 204. The payload stripper removes the payload 225 from full size packets and replaces it with a pointer 227 to generate reduced size packets; and the payload inserter in the cache replaces the pointer 227 with payload data 225 retrieved from a stored file. The payload stripper 330 controls the files stored at the cache 204. This means that the server 301 does not even need to know that the data is cached.

Figure 3:
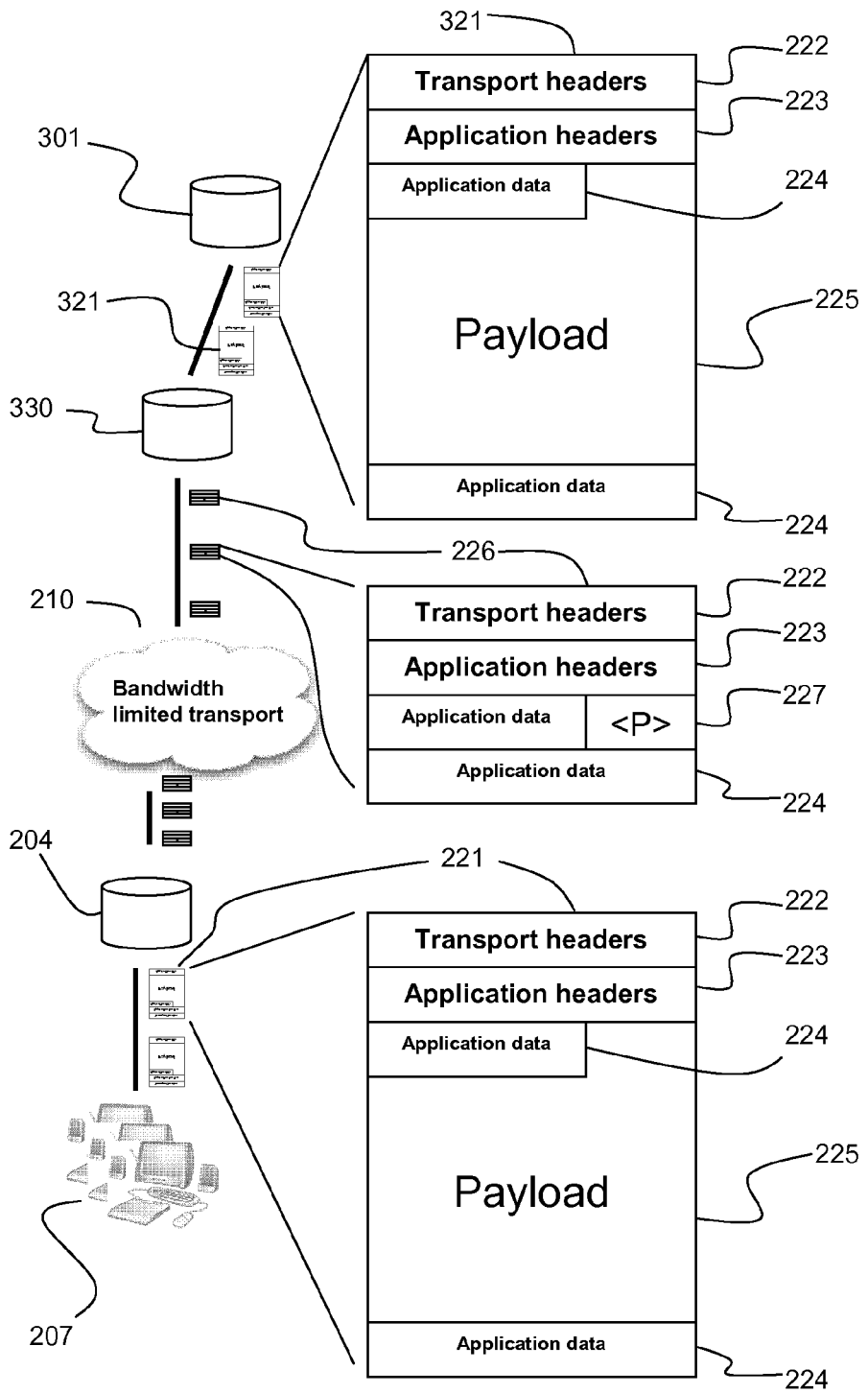
FIG. 3 is a schematic illustration of part of a network including a cache and payload stripper.

The arrangement of FIG. 2 may also be seen as a version of the arrangement of FIG. 3 in which the payload stripper 330 is collocated with the server 301.

The manner in which content is allocated to caches 204, 304 (where there are many caches in a network) is worthy of comment. In one scheme different content may be allocated to different caches. This makes it possible to tailor the caches for local demand.

In an alternative scheme, all the caches in a network (or in a particular area) may be populated with the same content. This is useful in situations such as a mobile system where a user may switch from end point to end point (e.g. between different base stations in a mobile network), since it makes it possible to continue an ongoing session elsewhere. If all of the caches have the same file, the client can move from cache to cache without the need to pass application or state information between the caches.

The case where caches all have the same content is less complex by nature and, as mentioned, is particularly useful in mobile networks.

It will be appreciated that the cache 204, 304 will need to be able to identify that it is receiving reduced size packets 226, and that it therefore needs to find the relevant data and insert it into these packets. One possible approach is for the cache to carry out Deep Packet Inspection (DPI) to identify which traffic needs to be processed in this way. Alternatively, reduced size packets 226 could be marked in some way to identify to the cache that it is necessary to insert the data payload. This could be achieved by inserting a marker into the header of the packet.

In a mobile network where data is transported in secured tunnels further functions may be needed to mark which packets should be processed by the cache. The actual processing, where pointers are replaced with content, although simple in nature, will be costly due to the sheer number of packets.

For example, a distinct feature of 3GPP System Architecture Evolution (SAE)/Evolved Packet Script (EPS) networks is the fact that traffic from a Public Data Network (PDN) gateway to a mobile terminal (UE) via an eNodeB is sent over secure tunnels. For access to the Evolved Packet Core (EPC) in Evolved UMTS Terrestrial Radio Access Networks (E-UTRAN), the PDN connectivity service is provided by an EPS bearer for the S5/S8 interfaces and the General Packet Radio Service (GPRS) Tunnelling Protocol (GTP) is used.

Each GTP user data packet carries a value, known as the Tunnel Endpoint Identifier (TEID), that identifies which bearer the packet belongs to. The value is selected by the entity terminating the GTP tunnel, and is communicated to the tunnel ingress point at bearer setup and handover. Usually a new bearer to the same terminal is established when different QoS treatment is needed.

If DPI is to be carried out, the packets destined for the UE (client) must be 're-routed' from their respective GTP tunnel and delivered to a DPI functionality which identifies those packets with a pointer instead of a data payload. These packets are then forwarded to the cache for payload population.

The application agnostic caching solution could be implemented on two levels; at the Serving Gateway (S-GW) or at the eNodeB. In both cases, for the correct tunnel to be selected, the TEID carrying the traffic to the UE should be signalled to the S-GW or eNodeB so that these nodes could then re-route the right traffic flow to the DPI function. The signalling is performed from the PDN GW which is aware of the packet flows which need payload population as well as the PDP context (TEID). After the payload has been inserted into the packets by the cache, the traffic needs to be inserted back into the same tunnel, again using the TEID.

The above discussion touches on one situation in which caching may be useful, but it will be appreciated that there are many other cases where the same principles may be applied. For example, similar caching processes are applicable for VoD using RTP over UDP and HTTP over TCP. Furthermore, the processes can be used for 2G and 3G networks in addition to LTE.

In addition, it will be appreciated that, although the system described above as advantages for use in mobile networks, it can also be used in fixed networks and cable networks. Furthermore, The above discussion is focussed on a network architecture in which all of the nodes (server 201, 301, payload stripper 330, cache 204, client 207) are shown as being located in the same network. It will be appreciated that this is often not the case. Caches are particularly useful in a network architecture in which the server is in one network and the client in another. It will be appreciated that this makes no difference to the operation of the system described above.

Figure 4:
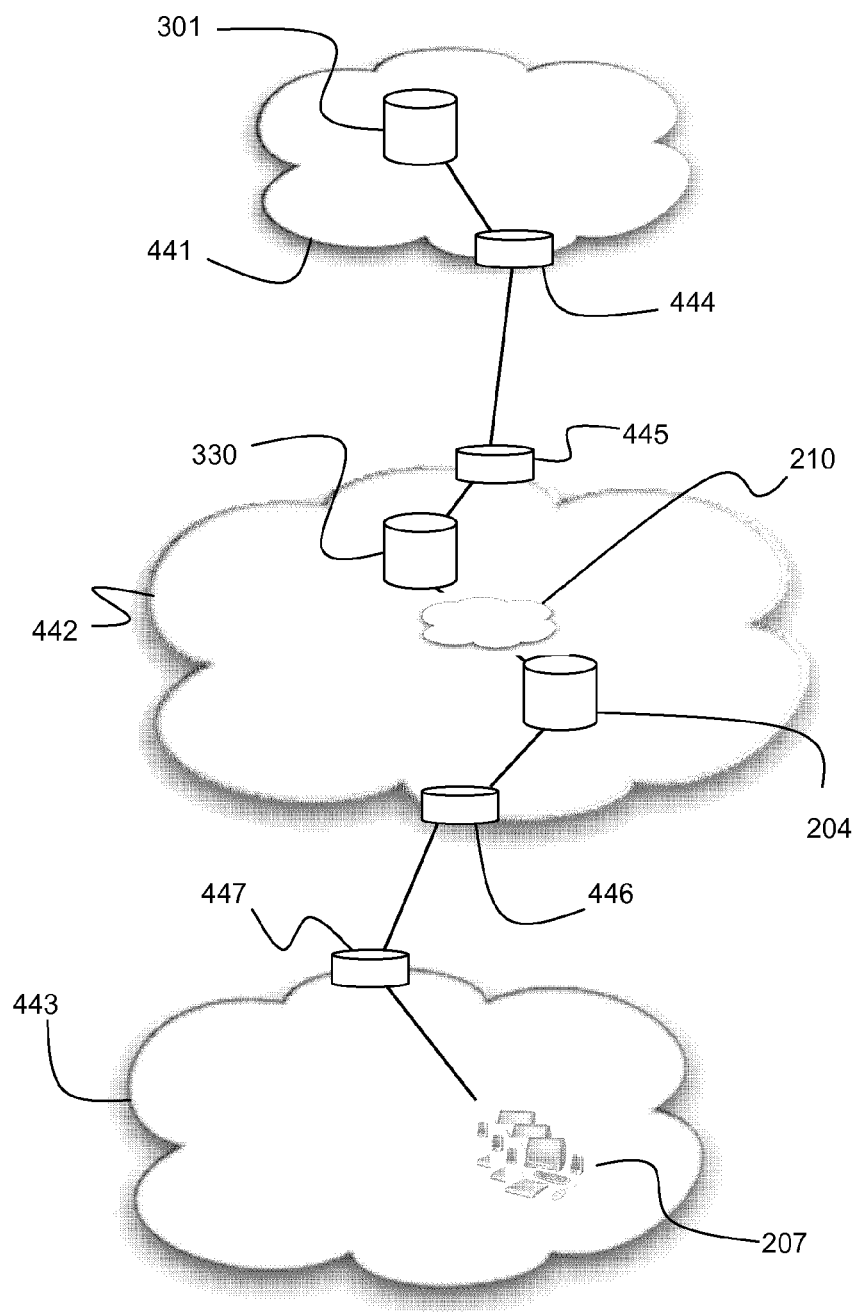
FIG. 4 is a schematic illustration of a server, payload stripper, cache and client spread across multiple networks.

For example, FIG. 4 illustrates an arrangement in which a server 301 (similar to that shown in FIG. 3) is located in a first network 441. The client is located in another network 443. Packets sent from the server 301 to the client pass through a core IP network 442 via routers 444, 445, 446, 447. If part of the core IP network 442 has a region of low bandwidth 210, the core IP network includes a payload stripper 330 and cache 204 which operate as described above with reference to FIG. 3. Different architectures may also be envisaged.

It will be appreciated that, depending on the network in which caching is employed and the underlying physical layer of that network, the number of packets transmitted might be as important (or more important) than their size. The discussion above is focussed on reducing the amount of data that is sent by decreasing the size of the payload in packets. However, the system can also be used to reduce the number of packets.

In order to implement a reduction in the number of packets, a group of reduced size packets can be sent together in one "aggregated" packet. Since the payload of each reduced size packet is extremely small (containing only a pointer), it is possible, for instance, to send packets together three at a time, or aggregate any number depending on how much delay can be accepted and how much packet loss is apparent in the network. This can be done in several ways.

The process of sending several packets together in one aggregated packet is referred to as tunnelling of one protocol inside another. One such implementation is known as Layer 2 Tunnelling Protocol, which facilitates the tunnelling of PPP packets across an intervening network in a way that is as transparent as possible to end-users and applications. It acts like a data link layer protocol in the OSI model but uses UDP over IP as transport for the packets. Other well known tunnelling techniques are SSH tunnelling which offers encrypted tunnels for any protocol.

Although these tunnelling principles could be used to aggregate packets, a more focussed approach may also be appropriate for these particular circumstances. In FIG. 3, packets flowing from the payload stripper 330 are to the cache 204 shown exclusively as reduced size packets 226. In a more sophisticated arrangement, packets travelling between the payload stripper 330 and the cache 204 could have a special format that essentially encodes packets in one of two forms:

Type 1 packets (simple packets) correspond to the reduced size packets 226 shown in FIG. 3, in which the payload of the packet consists of application data 224 and payload pointer(s) 227.

Figure 5:
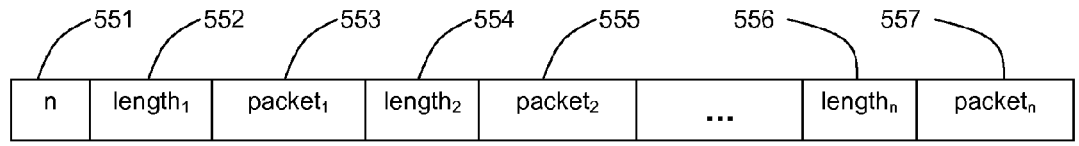
FIG. 5 is an illustration of the contents of an aggregated packet.

Type 2 packets (aggregated packets) are more complex. These packets contain a list of simple packets held within them. It is possible to imagine a recursive structure in which aggregated packets are themselves further combined to form "super-aggregated" packets, although for all practical reasons there is likely to be no reason to have type 2 packets contained inside another type 2 packet. There are many ways to implement the encoding of this format, and one example is provided in FIG. 5, which illustrates a type 2 packet 550. The packet contains a field 551 indicating how many simple packets are contained in the current aggregated packet (n). The next field 552 contains the length (length$_1$) of a simple packet (packet$_1$), and this is followed by the packet 553 itself. This is repeated for each packet, with the length$_2$ 554 of packet$_2$ 555 preceding the packet itself, up to the length 556 of packet$_n$ 557.

A type 1 packet could be defined in the same way having n=1. The packet could also be encoded without the need for a separate length field 552, 554, 556 for each simple packet 553, 555, 557 if the length of a packet can be easily obtained from the packet itself.

As will be appreciated, this format is just one example. The format can be optimized for each deployment depending on the underlying network. There may or may not be a need to tunnel the packets. In some cases one might need lots of meta information for each packet that is tunnelled. The important feature is that the formats are recognised by both the payload stripper 330 and the cache 204 so that they are in synch when it comes to encoding and decoding of packets.

Figure 6:
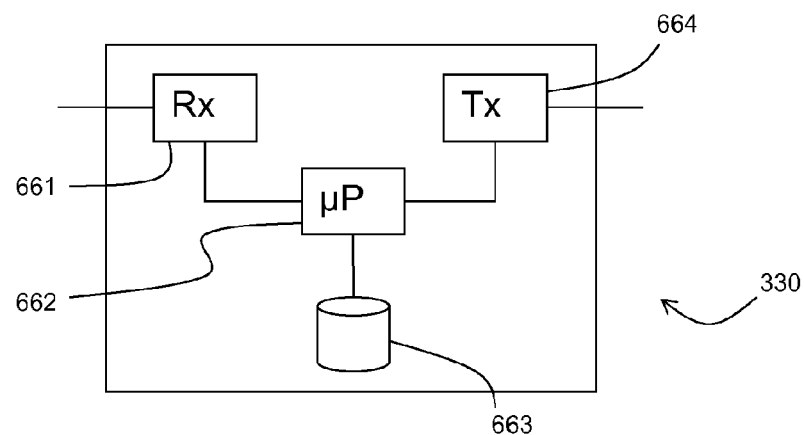
FIG. 6 is a schematic illustration of a payload stripper.

FIG. 6 is a schematic illustration of a payload stripper 330. The payload stripper 330 includes a receiver 661 for receiving full size packets from a server. The packets are processed by a processor 662 which removes the payload of each packet, and replaces it by a pointer to a location in a file held by a cache 204 (as shown in FIG. 3). A storage medium 663 contains records of the files held by the cache to enable the processor 662 to determine the information which should be encoded in the pointer. A transmitter forwards the packets towards a cache.

Figure 7:
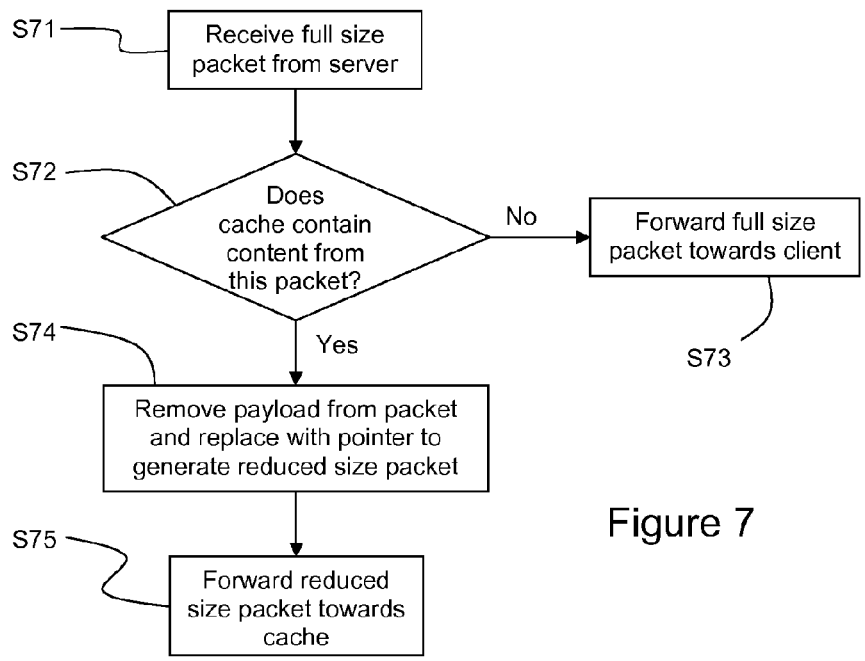
FIG. 7 is a flow chart illustrating actions carried out by a payload stripper.

FIG. 7 is a flow diagram illustrating how a packet is treated by the payload stripper 330.

S71: A full size packet is received by the payload stripper 330 from the server.

S72: The packet stripper knows if content contained in this packet is cached further down the network. If it is not, then the packet is forwarded unchanged S73 towards the client.

S74: If the content is cached, the payload is removed from the packet and replaced by a pointer which will identify where, in a file held by the cache, the data corresponding to the payload can be found. This results in a reduced size packet.

S75: The reduced size packet is transmitted through the network towards the cache.

Figure 8:
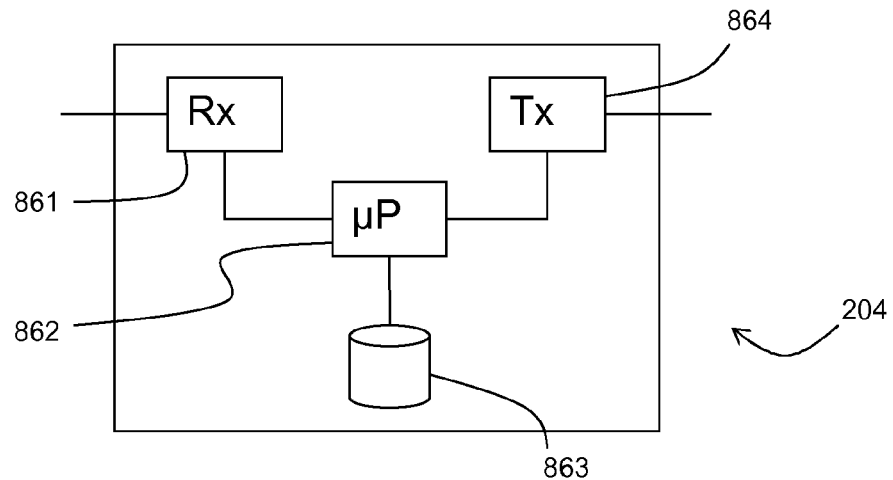
FIG. 8 is a schematic illustration of a cache.

FIG. 8 is a schematic illustration of a cache 204. The cache 204 includes a receiver 861 for receiving reduced size packets from a payload stripper 330 or server 201. A storage medium 863 contains cached data. Each reduced size packet contains a pointer identifying a file held in the storage medium 863, together with a location in the file and length of data. A processor 862 extracts the pointer from each reduced size packet, identifies the relevant file and data in the storage medium 863, and inserts the data into the packet as a payload to generate a full size packet. A transmitter 864 transmits the full size packet towards a client.

Figure 9:
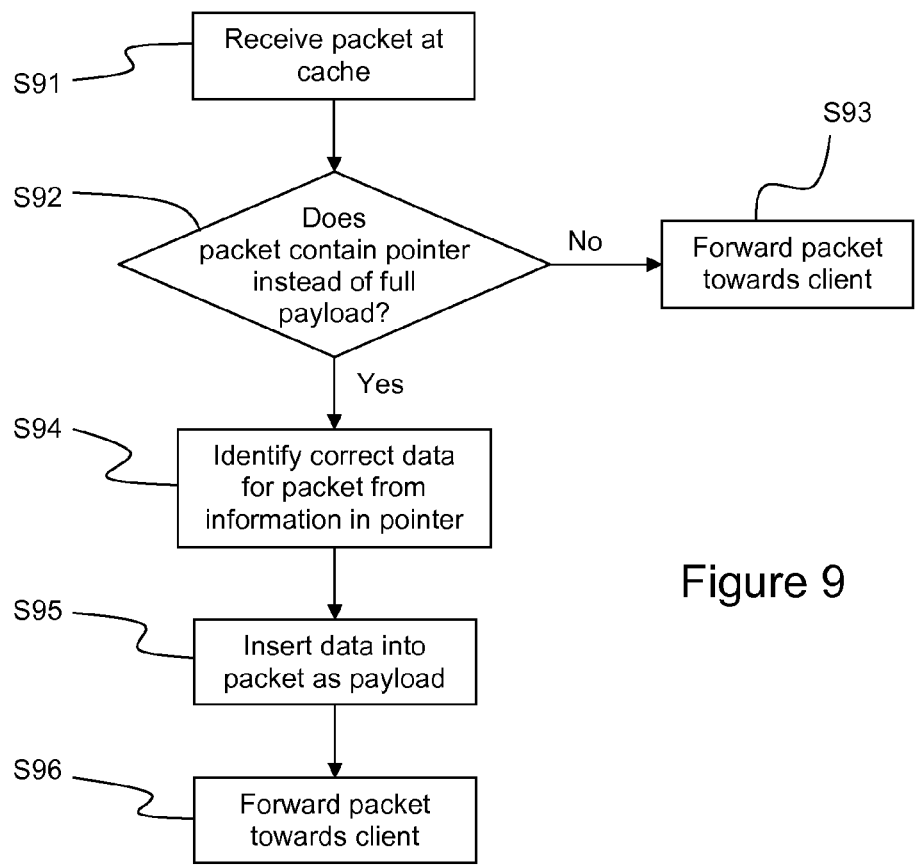
FIG. 9 is a flow chart illustrating actions carried out by a cache.

FIG. 9 is a flow diagram illustrating the operation of the cache 204.

S91: A packet is received at the cache.

S92: The packet is checked (either by DPI or by a search for a marker in the header) to determine if it contains a full payload, or a pointer to a file held by the cache.

S93: If the packet contains a full payload it is forwarded unchanged towards the client.

S94: If the packet contains a pointer, the correct data, held in a file at the cache, is identified from the information held in the pointer.

S95: The data is inserted into the packet as a payload, replacing the pointer, to generate a full size packet.

S96: The full size packet is sent into the network towards the client.

Figure 10:
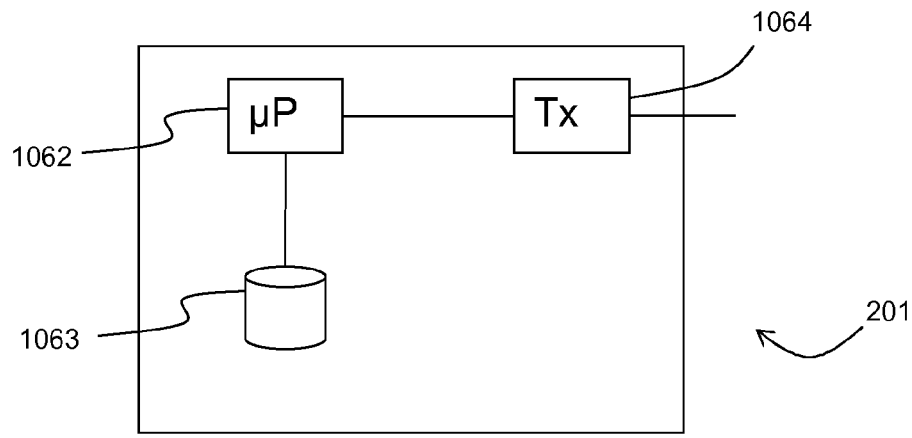
FIG. 10 is a schematic illustration of a server.

FIG. 10 is a schematic illustration of a server 201. The server 201 includes a processor 1062, storage medium 1063 and transmitter 1064. Reduced size packets are generated by the processor 1062, each packet containing in its payload a pointed to a location in a file held by a cache 204 (as shown in FIG. 3). The storage medium 1063 contains records of the files held by the cache to enable the processor 1062 to determine the information which should be encoded in the pointer. The transmitter 1064 forwards the packets towards a cache.

Figure 11:
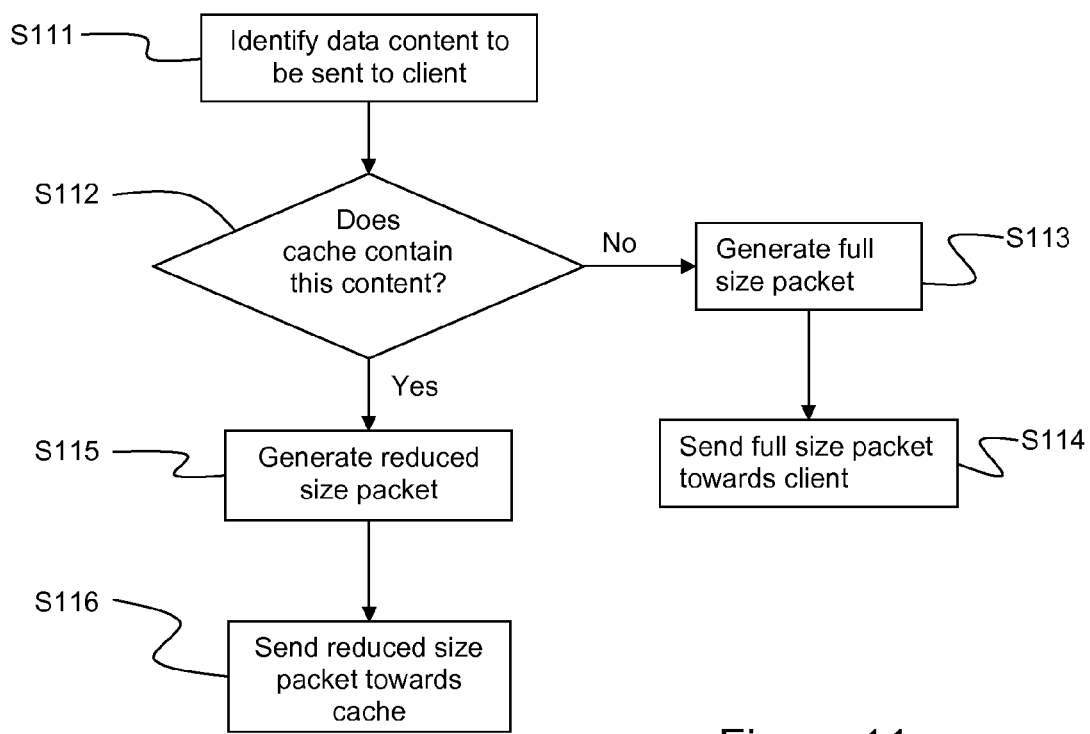
FIG. 11 is a flow chart illustrating actions carried out by a server.

FIG. 11 is a flow diagram illustrating how a packet is created and forwarded treated by the server 201.

S111: Content to be sent towards the client is identified.

S112: The server knows if this content is cached further down the network. If it is not, then a full size packet is generated S113 and forwarded S114 towards the client.

S115: If the content is cached, a reduced size packet is generated. The payload of the reduced size packet is replaced by a pointer which will identify where, in a file held by the cache, the data corresponding to the payload can be found.

S116: The reduced size packet is transmitted through the network towards the cache.

As has been explained above, the benefit of caching in any network is to limit the amount of network traffic, making it possible to replace network investment costs (which are expensive) with storage investment costs (which are relatively cheap). By further splitting application logic and state from simple payload data it is possible to make the caches application agnostic. This makes it possible to use the same caching infrastructure for several different applications such as RTSP streaming and HTTP- or P2P download. Since the cache is simple and lacks complicated logic it can be made robust and fault free. In this way it can more or less be seen as a piece of hardware (in fact, it can be implemented in hardware) that can be replaced and restarted by unqualified personnel. Furthermore, for systems where a user can switch end point during the life-time of a session, this can be done in a much simpler manner as no session state needs to be migrated between caches. Session state is always kept where it is handled best—in the central server (or an application-aware payload stripper).

The invention claimed is:

1. A cache for use in a packet data network, comprising:
    a receiver configured to receive a packet, the received packet having a payload and a header distinct from the payload;

a storage medium configured to store cached data;
a processor operatively connected to the receiver and the storage medium, the processor configured to:
  identify whether the payload of the received packet contains pointer information identifying a payload data segment of the cached data stored in the storage medium; and
  responsive to the payload of the received packet containing the pointer information, use the pointer information to locate and retrieve the payload data segment from the storage medium and insert the retrieved payload data segment into the payload of the packet; and
a transmitter operatively connected to the processor configured to forward the packet, including the inserted payload data segment, towards a client.

2. The cache of claim 1, wherein the processor is configured to replace the pointer information in the packet with the retrieved payload data segment.

3. The cache of claim 1, wherein the processor is configured to carry out Deep Packet Inspection to identify whether the payload of the packet contains the pointer information.

4. The cache of claim 1, wherein the processor is configured to search a header of the packet for a marker identifying whether the payload of the packet contains the pointer information.

5. The cache of claim 1, wherein the pointer information includes:
  a file ID identifying a cached file stored in the storage medium containing the payload data segment;
  a location ID identifying the location of the payload data segment within the file; and
  a length ID identifying the length of the payload data segment.

6. A payload stripper node for use in a packet data network, the payload stripper node comprising:
  a receiver configured to receive a packet, the received packet having a payload and a header distinct from the payload;
  a storage medium configured to store records of data held by a cache;
  a processor operatively connected to the receiver and storage medium, the processor configured to:
    identify whether a payload data segment contained in a payload of the received packet is held by the cache; and
    responsive to the payload data segment being held by the cache, to extract the payload data segment from the packet and insert pointer information into the payload of the packet, the pointer information enabling the cache to identify the payload data segment from the data held by the cache; and
  a transmitter operatively connected to the processor and configured to forward the packet that includes the pointer in place of the payload data towards the cache.

7. The payload stripper node of claim 6, wherein the processor is further configured to populate the cache with payload data.

8. The payload stripper node of claim 6, wherein the pointer information includes:
  a file ID identifying a file stored in the cache containing the payload data segment;
  a location ID identifying the location of the payload data segment within the file; and
  a length ID identifying the length of the payload data segment.

9. The payload stripper node of claim 6, wherein the processor is further configured to insert a marker into a header of the packet to indicate that the payload of the packet contains pointer information instead of the payload data.

10. The payload stripper node of claim 6, wherein the processor is further configured to combine packets from which payload segments have been extracted to form an aggregated packet.

11. A system for transmitting data through one or more packet data networks comprising a packet sending node and a cache node, the packet sending node arranged to send a reduced size packet towards the cache node, the reduced size packet including in its payload a pointer to a payload data segment stored in a file at the cache node, the cache node configured to:
  receive the reduced size packet, the reduced size packet having a payload and a header distinct from the payload;
  use the pointer to identify the payload data segment from data stored at the cache node;
  insert the payload data segment into the reduced size packet in place of the pointer so as to generate a full size packet; and
  send the full size packet towards a client.

12. The system of claim 11, wherein the packet sending node is a packet stripping node configured to:
  receive a full size packet containing the payload data segment, and
  remove the payload data segment from the full size packet and replace the payload data segment with the pointer to generate the reduced size packet.

13. The system of claim 11, wherein the packet sending node is a server.

14. The system of claim 11, wherein the one or more packet data networks include a plurality of cache nodes, each of which has the same cached data stored thereon.

15. The system of claim 11, wherein the packet sending node is responsible for managing the data stored at the cache node.

16. A method of sending data through one or more packet data networks, comprising:
  sending a reduced size packet from a packet-sending node towards a cache node, the reduced size packet including in its payload a pointer to a payload data segment stored in a file at the cache node, the reduced size packet having a payload and a header distinct from the payload;
  receiving the reduced size packet at the cache node;
  using the pointer in the payload to identify the payload data segment from data stored at the cache node;
  inserting the payload data segment into the reduced size packet in place of the pointer to generate a full size packet; and
  sending the full size packet from the cache node towards a client.

17. The method of claim 16, wherein the packet-sending node receives a full size packet containing the payload data segment, removes the payload segment from the full size packet, and replaces the payload segment with the pointer to generate the reduced size packet.

18. The method of claim 16, wherein the packet-sending node is a server.

19. The method of claim 16, wherein the one or more packet data networks include a plurality of cache nodes, each of which has the same data stored thereon.

20. A computer program product stored in a non-transitory computer-readable medium, the computer program product comprising computer program code for configuring a cache in a packet data network, which, when executed on the cache, configures the cache to:

identify whether a payload of a packet received by the cache contains pointer information identifying a payload segment of data stored by the cache, the packet having a payload and a header distinct from the payload; and responsive to the payload containing the pointer information, use the pointer information to:
locate and retrieve the payload data segment,
insert the retrieved payload data segment into the payload of the packet, and forward the packet towards a client.

21. A computer program product stored in a non-transitory computer-readable medium, the computer program product comprising computer program code for configuring a server in a packet data network, which, when executed on the server, configures the server to:

generate a packet to be sent towards a client to enable a payload segment of data to be delivered to the client, the packet having a payload and a header distinct from the payload;

identify whether the payload data segment is held by a cache downstream of the server; and responsive to the payload data segment being held by the cache, insert pointer information into the payload of the packet, the pointer information enabling the cache to identify the payload data segment from the data held by the cache, and forward the packet towards the cache.

22. The computer program product of claim 21, wherein the computer program product is carried on a carrier medium.

* * * * *